(12) United States Patent
Watts-Englert et al.

(10) Patent No.: US 9,864,479 B2
(45) Date of Patent: Jan. 9, 2018

(54) SYSTEM AND METHOD FOR MANAGING AND REVIEWING DOCUMENT INTEGRATION AND UPDATES

(71) Applicant: Xerox Corporation, Norwalk, CT (US)

(72) Inventors: Jennifer Watts-Englert, Pittsford, NY (US); Reiner Eschbach, Webster, NY (US); Saurabh Prabhat, Webster, NY (US); Emil V. Rainero, Webster, NY (US); Kenton Karl Hofmeister, Portland, OR (US)

(73) Assignee: Xerox Corporation, Norwalk, CT (US)

(*) Notice: Subject to any disclaimer, the term of this patent is extended or adjusted under 35 U.S.C. 154(b) by 437 days.

(21) Appl. No.: 14/576,273

(22) Filed: Dec. 19, 2014

(65) Prior Publication Data

US 2016/0180167 A1     Jun. 23, 2016

(51) Int. Cl.
| | |
|---|---|
| *G06F 3/00* | (2006.01) |
| *G06F 3/0481* | (2013.01) |
| *G06F 3/0486* | (2013.01) |
| *G06F 3/0484* | (2013.01) |
| *G06F 17/21* | (2006.01) |
| *G06F 17/24* | (2006.01) |
| *G06F 17/30* | (2006.01) |
| *G06F 3/01* | (2006.01) |

(52) U.S. Cl.
CPC .......... *G06F 3/0481* (2013.01); *G06F 3/0486* (2013.01); *G06F 3/04842* (2013.01); *G06F 3/04845* (2013.01); *G06F 17/218* (2013.01); *G06F 17/241* (2013.01); *G06F 17/30648* (2013.01); *G06F 17/30663* (2013.01); *G06F 17/30705* (2013.01)

(58) Field of Classification Search
CPC .............. G06F 3/0481; G06F 3/04842; G06F 3/04845; G06F 3/0486
See application file for complete search history.

(56) References Cited

U.S. PATENT DOCUMENTS

| | | | |
|---|---|---|---|
| 6,377,710 B1 | 4/2002 | Saund | |
| 6,411,733 B1 | 6/2002 | Saund | |
| 6,515,684 B1* | 2/2003 | Knodt | ................ H04N 1/00408 |
| | | | 358/1.15 |
| 6,903,751 B2 | 6/2005 | Saund et al. | |
| 7,036,077 B2 | 4/2006 | Saund et al. | |
| 7,086,013 B2 | 8/2006 | Saund et al. | |
| 7,136,082 B2 | 11/2006 | Saund et al. | |
| 7,139,004 B2 | 11/2006 | Saund et al. | |
| 7,177,483 B2 | 2/2007 | Saund | |
| 7,576,753 B2 | 8/2009 | Saund et al. | |
| 7,725,493 B2 | 5/2010 | Saund | |
| 7,792,849 B2* | 9/2010 | Anderson | ......... G06F 17/30292 |
| | | | 707/758 |

(Continued)

OTHER PUBLICATIONS

Excel 2007 For Dummies: Comparing Two Excel 2007 Worksheets Side by Side, Gerg Harvey, http://www.dummies.com/how-to/content/comparing-two-excel-2007-worksheets-side-by-side.html 2007.

*Primary Examiner* — Nicholas Augustine

(74) *Attorney, Agent, or Firm* — Duane C. Basch; Basch & Nickerson LLP

(57) ABSTRACT

Disclosed is a system and methods for selecting, organizing and presenting selected regions of digital documents within a dynamic display window for the arrangement and review of such regions.

16 Claims, 4 Drawing Sheets

(56) References Cited

U.S. PATENT DOCUMENTS

| | | | |
|---|---|---|---|
| 7,907,141 B2 | 3/2011 | Saund | |
| 8,014,607 B2 | 9/2011 | Saund et al. | |
| 8,264,502 B2 * | 9/2012 | Wang | G06K 9/00442 345/156 |
| 2006/0090143 A1 * | 4/2006 | Tanaka | G06F 3/0482 715/810 |
| 2012/0072859 A1 * | 3/2012 | Wang | G06K 9/00442 715/764 |

* cited by examiner

SYSTEM AND METHOD FOR MANAGING AND REVIEWING DOCUMENT INTEGRATION AND UPDATES

Disclosed herein is a system and method that provides a user(s) with the affordances of paper when needing to visually examine DIGITAL document content, particularly in parallel review.

CROSS REFERENCE TO RELATED PATENTS AND APPLICATIONS

The following patents are hereby cross-referenced and incorporated herein by reference in their entirety:

U.S. Pat. No. 8,014,607 to Saund et al., for METHOD AND APPARATUS FOR CREATING AND EDITING NODE-LINK DIAGRAMS IN PEN COMPUTING SYSTEMS, issued Sep. 6, 2011;

U.S. Pat. No. 7,907,141 to Saund et al. for METHODS AND PROCESSES FOR RECOGNITION OF ELECTRONIC INK STROKES, issued Mar. 15, 2011;

U.S. Pat. No. 7,724,493 to Saund et al. for OPTIMIZATION METHOD AND PROCESS USING TREE SEARCHING OPERATION AND NON-OVERLAPPING SUPPORT CONSTRAINT REQUIREMENTS, issued May 25, 2010;

U.S. Pat. No. 7,576,753 to Saund et al. for METHOD AND APPARATUS TO CONVERT BITMAPPED IMAGES FOR USE IN A STRUCTURED TEXT/GRAPHICS EDITOR, issued Aug. 18, 2009;

U.S. Pat. No. 7,177,483 to Saund for SYSTEM AND METHOD FOR ENHANCEMENT OF DOCUMENT IMAGES, issued Feb. 13, 2007;

U.S. Pat. No. 7,139,004 to Saund et al. for METHOD AND APPARATUS TO CONVERT BITMAPPED IMAGES FOR USE IN A STRUCTURED TEXT/GRAPHICS EDITOR, issued Nov. 21, 2006;

U.S. Pat. No. 7,136,082 to Saund et al. for METHOD AND APPARATUS TO CONVERT DIGITAL INK IMAGES FOR USE IN A STRUCTURED TEXT/GRAPHICS EDITOR, issued Nov. 14, 2006;

U.S. Pat. No. 7,086,013 to Saund et al. for METHOD AND SYSTEM FOR OVERLOADING LOOP SELECTION COMMANDS IN A SYSTEM FOR SELECTING AND ARRANGING VISIBLE MATERIAL IN DOCUMENT IMAGES, issued Aug. 1, 2006;

U.S. Pat. No. 7,036,077 to Saund et al. for METHOD FOR GESTURAL INTERPRETATION IN A SYSTEM FOR SELECTING AND ARRANGING VISIBLE MATERIAL IN DOCUMENT IMAGES, issued Apr. 25, 2006;

U.S. Pat. No. 6,903,751 to Saund et al. for SYSTEM AND METHOD FOR EDITING ELECTRONIC IMAGES, issued Jun. 7, 2005;

U.S. Pat. No. 6,377,710 to Saund for METHOD AND APPARATUS FOR EXTRACTING THE SKELETON OF A BINARY FIGURE BY CONTOUR-BASED EROSION, issued Apr. 23, 2002; and U.S. Pat. No. 6,411,733 to Saund for METHOD AND APPARATUS FOR SEPARATING DOCUMENT IMAGE OBJECT TYPES, issued Jun. 25, 2002.

BACKGROUND AND SUMMARY

While the disclosed embodiments are particularly directed to digital document processing and review and described with specific reference thereto, it is to be appreciated the various embodiments may have usefulness in other fields and applications.

Electronic communication and digital documents have become standard document formats replacing or enhancing earlier modes of communication. For example, business, education and science use electronic or digital communications. These digital media are commonly created through structured text/graphics editor programs including MICROSOFT WORD, POWERPOINT, EXCEL, etc. These programs offer editing capabilities for both text and graphic material. While such text/graphics editors have met with significant commercial success and usage, existing implementations have limitations. Particularly, such editors require the creation and editing of material to take place within the system via manual operations. Due to these limitations existing text/graphics editors are not able to meet the demands of workers employing different modes of work, such as working with physical documents, particularly for editing and review.

It has been determined that knowledge workers often print documents so they can visually examine content located in different places within the documents—in parallel. They also print to compare content across documents. Paper makes the comparison process easy because related content can be laid out next to each other. Also, non-related content can be filtered out. For example, people can cut bits of content out of a paper document and lay the bits out on a table to examine them in parallel. They can also fold paper to filter non-related content and therefore show related content next to each other. In accordance with aspects of the disclosed system and methods, as users read through a document, they can employ the disclosed system and methods to mark areas of content they wish to compare. When the user(s) is ready to compare the content, the marked content is arranged into a summary window so it can be visually examined it in parallel (e.g., side-by-side, in seriatim, etc.).

Current software tools allow limited ability to compare related content, and the process for comparing content is laborious. For example, in MS Word or similar programs operating on a computing platform, to compare content that is spatially separated within the same document, the user could open the file multiple times (to show different windows or views into the file), and choose the "show side by side" option. This creates a pane of tiled windows. Within each of these windows, the user must remember where the content to be compared is located, and scroll to that content to show it in the windows. Alternatively, a user could use a split window option in MS-Word but cannot then display portions of the document in a side-by-side relationship.

As disclosed herein the system and methods provide a way to compare digital content by leveraging the affordances that paper provides for manipulation of pages and portions thereof.

Disclosed in embodiments herein is a system to compare digital document content, comprising: a device having a processor to execute programmatic instructions; a memory, operatively associated with the processor, for storing data relating to the selection of each of multiple distinct regions of information with the digital document content, each in association with a user-specified marker; and a display, said display including a dynamically updateable comparing window said comparing window depicting at least a plurality of the regions and the marker associated therewith to facilitate comparison of the regions by a viewer.

Further disclosed in embodiments herein is a method to compare digital document content, comprising: selecting a first region within a document for comparison, said first region being visually depicted as having been selected, and said system automatically assigning a first marker to the first region; selecting a second region within a document for comparison, said second region being visually depicted as having been selected, and said system automatically assigning a second, unique marker to the second region; and presenting a comparing window on a visual display, said comparing window depicting the first region and the second region to facilitate comparison of the at least two regions by a viewer.

Also disclosed herein is a method to examine portions of digital document content, comprising: a user selecting a plurality of document regions for comparison, said regions each being visually depicted (highlight, color, sidebar marker) as having been selected, and said system automatically assigning a unique marker to each selected region; providing a user-specified tag to each selected region; and presenting, to the user, a comparison window on a visual display, said comparison window depicting at least two selected document regions therein, along with the associated markers, to facilitate comparison of the regions by the user, wherein the regions presented for comparison are based, at least in part, on at least one common characteristic (color, tag text, etc.) of the user-specified tag

Figure 1:
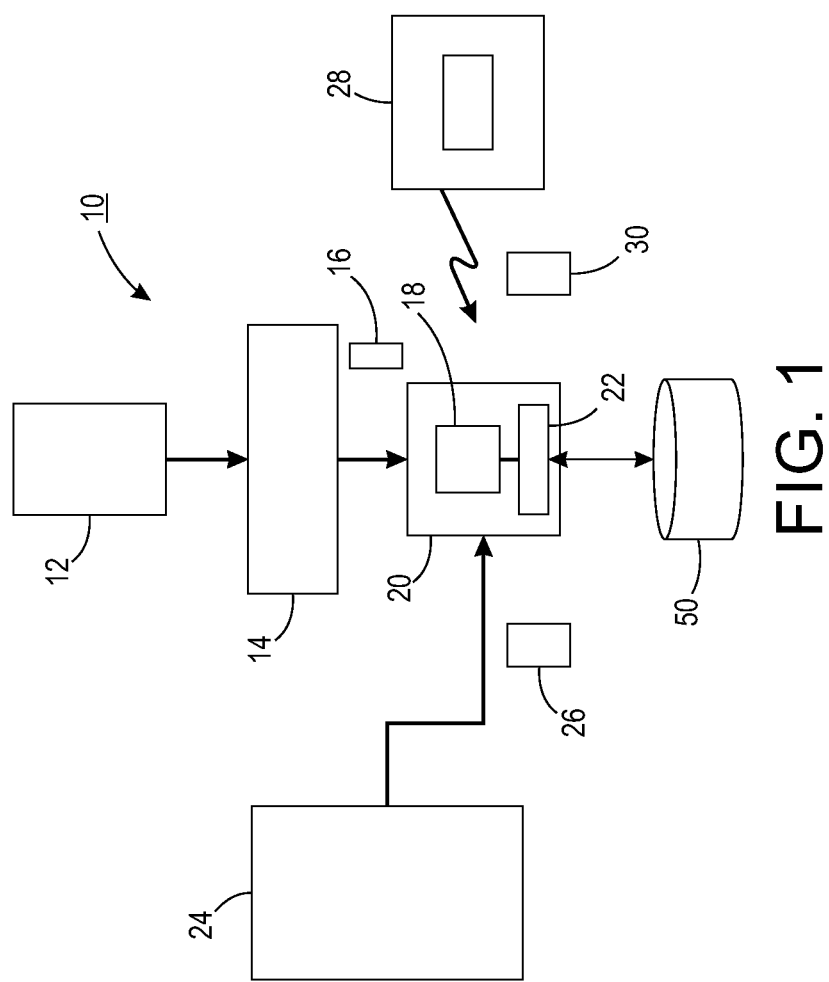
FIG. 1 is a schematic illustration of an exemplary system in accordance with the disclosed embodiments.

The various embodiments described herein are not intended to limit the disclosure to those embodiments described. On the contrary, the intent is to cover all alternatives, modifications, and equivalents as may be included within the spirit and scope of the various embodiments and equivalents set forth. For a general understanding, reference is made to the drawings. In the drawings, like references have been used throughout to designate identical or similar elements. It is also noted that the drawings may not have been drawn to scale and that certain regions may have been purposely drawn disproportionately so that the features and aspects could be properly depicted.

DETAILED DESCRIPTION

Depicted in FIG. 1 is a system 10 in which the concepts of the disclosed embodiments may be implemented. System 10 illustrates various channels or sources by which text, graphics and/or images are formed as a digital document. The documents are a stable intermediate point at which the systems and methods of the disclosed embodiments would be invoked. It is to be further appreciated that the disclosed operations may also be invoked upon the input of documents from another source, or across multiple platforms (e.g., client-server, networked or paired computing platforms and the like).

More particularly, a document(s) 12 may be input via a scanner 14 which converts the images into electronic images and associated text and/or graphics 16. Information on document 12 may be created by digital editing, pens, pencils, or other non-electronic materials. Digital document 16 is displayed on a display screen 18 of a computer, personal digital system or other electronic device 20, which includes a processor or similar computing device 22.

Alternatively, a whiteboard or other digital ink device 24 may be coupled to electronic device 20, whereby bitmapped or digital documents 26 are electronically transmitted to device 20 via wired or wireless channels. Another channel by which digital documents maybe produced is through use of another electronic device 28. This device can be any of a number of systems, including but not limited to a computer having a structured text/graphics editor, a computerized CAD system, a server on the Internet which delivers web pages, or any other system in which an electronic tablet, personal digital assistant (PDA) or similar interface provides digital document 30. Furthermore, software such as that described above may be loaded on electronic device 20 or any of the other disclosed devices and such devices can be used to generate a digital document for processing by computing device 22 in accordance with the methods described herein.

It is to be appreciated that while the disclosed embodiments include a variety of channels or sources of the digital documents, the disclosed methods are equally applicable to digital documents obtained through various related or alternative sources. Thus, concepts of the disclosed embodiments extend document analysis and review beyond the ability to simply view or edit portions of a document in a window(s).

In summary, the system for comparing digital document content, includes a device having a processor or computing device to execute programmatic instructions, along with an operatively associated memory (e.g., database) for storing data relating to the selection of each of multiple distinct regions of information with the digital document content, each in association with a user-specified marker. The system also includes a display, including a dynamically updateable comparing window to depict or show at least a plurality of the regions and the associated marker(s) to facilitate comparison of the regions by a viewer. By use of the terms "compare" or "comparison" the intent is to include various forms of and techniques for examining similarities or differences between two or more regions or portions of a document(s) when viewed or otherwise analyzed simultaneously. For example, viewing two or more regions in a viewer or window simultaneously.

Having described an exemplary system upon which the disclosed embodiments may operate attention is now turned to a description of the operation as carried out on a system such as that represented in FIG. 1. The following methods leverage the affordances of paper to allow a user to visually compare bits of digital document content from within the same document, or across documents.

The method, which may be implemented via programmatic instructions carried out by one or more computing devices independently or in conjunction with one another, allows a user(s) to select and mark areas or regions of a document to review or more specifically compare. As will be appreciated, the methods for selection of a region in a document include not only conventional selection using a pointing device or cursor within a text or other structured document, as well as less conventional techniques as applied to other document types (e.g., images) such as those suggested by Saund et al. in the patents previously incorporated by reference, and the use of a finger or stylus on a touch-sensitive screen such as a tablet computer, mobile or other handheld device (e.g., device 22).

As users read through a document, they can select areas of the document using a selection tool that could be available in a toolbar or menu. Alternatively, the selection tool might be initiated in response to a particular gesture with a finger or stylus, or other technique associated with the computing device. When content is selected with this tool, the content is outlined or highlighted with a color. A marker or tag is placed in a sidebar next to the document. This marker is attached to the selected area of the document, and is always visible until it is deleted. The marker(s) are in human-understandable form in terms of user display, but contain a machine generated component that maintains uniqueness (e.g., unique selection ID).

Figure 2:
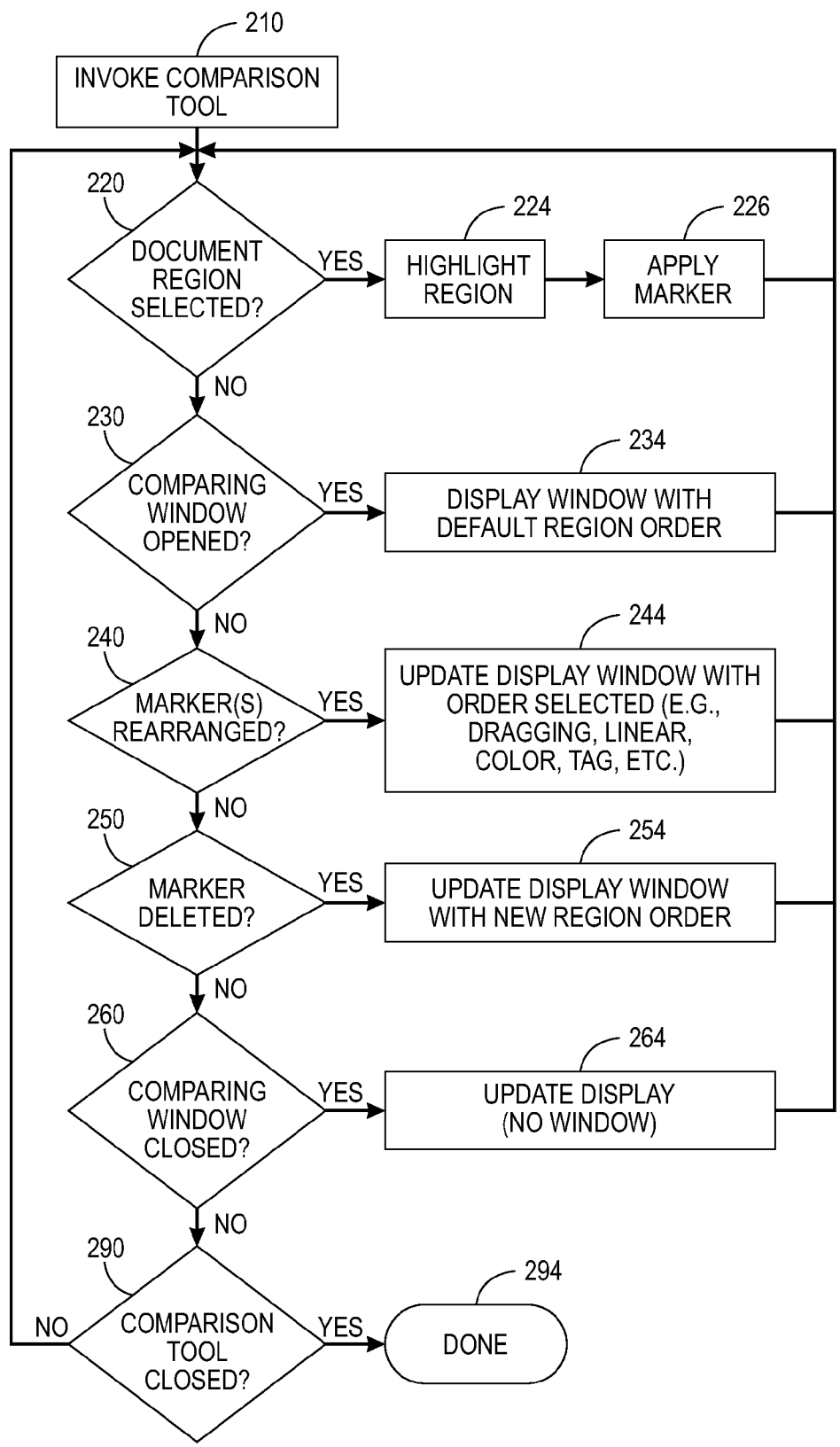
FIG. 2 is a flow diagram depicting various operations carried out by the system.

As illustrated in the flow diagram of FIG. 2, the user(s) initially invokes the comparison tool at 210, possibly as an associated or related application, or an add-on, that would operate while the user is using a conventional text editing program such as MS-Word or other document viewing program or system. As will be further appreciated, the tool may be automatically started as an add-on program upon opening the image editor or document identified for review.

In response to the user's selection of a document region, the program could present the option of selecting a highlighted region (operation 220). For example, in one embodiment, the program could present, for the user, at least one selection cursor that would be used for indicating the region of the document to be selected and tagged (indicated by highlighting 224). Alternatively, in response to a right mouse click, the operation might initiate a menu option that is presented to select and tag a previously selected region. It will be appreciated that when referring to selection of a region, the conventional techniques relating to the use of a cursor and/or pointer may be employed, and that the techniques available may be dictated by the editor software and/or operating system software being used. It would also be possible, depending upon the editing software capabilities, to select sentences, paragraphs or other document structures including graphics, images, and combinations thereof, as a region.

In one embodiment, the selections and associated tags are each identified via a unique identifier and stored in a database 50 that is operatively associated with and thereby accessible to at least one computing device 22. It will be understood that database 50 may be a local resource managed by and available only to device 22. In an alternative embodiment, database 50 may be accessible to a plurality of devices to facilitate the concurrent use and review of various documents, selections and associated tags—for example by multiple editors working on the same document or sharing their analysis, or by a single author who is editing or comparing information across more than one device. An exemplary record for the database may be in the following form:

| ID | Filename | NtwkLoc | Bounds (dynamic) | TagText | Color |
|---|---|---|---|---|---|
| 772A | Test.docx | C:\user | P3,L3,C1:P3,L6,C20 | Ipad | LtGrn |
| 112E | Test.docx | C:\user | P7,L1,C1:P7,L4,C24 | Ipad | LtGrn |
| 711A | Test.docx | C:\user | P8,L27,C8:P9,L3,C19 | Ipad | LtGrn |
| 467B | Test.docx | C:\user | P8,236:12;P8,468:920 | ipod | Pink |
| 223A | Test.docx | C:\user | P8, L1,C3:P9,L3,C19 | tech | Yel |
| . | . | . | . | . | . |
| . | . | . | . | . | . |

Continuing with FIG. 2, other operations that may be initiated by a user include opening of the comparing window (operation 230) by selecting one of the markers or tags. The result of such a selection would be the initiation of a display window as represented by operation 234 (e.g., FIGS. 3-4), and display of selections and/or tags along a sidebar of the window. It is also possible for a user to modify the display properties by rearranging markers (operation 240) by dragging them within the sidebar, or by selecting a pre-defined button that re-orders markers in a linear order based upon document position of the selection, by color and/or tag name, or other ordering schemes as represented by operation 244. It should also be appreciated that the display window of FIGS. 3-4, although depicting the sidebar as appearing along a vertical edge of the window 320, could also be displayed along other edges of the window, could be invoked in a different format altogether including a toolbar, menu, etc., or could be shown in a separate device like a tablet or smartphone.

As represented in FIG. 2, it is also possible to delete a tag or marker (operation 250), whereby the comparing window displayed would be updated to eliminate the deleted marker at operation 254 and associated selections and would return to a prior display format or a default display order illustrating the remaining tags. It would also be possible for a user to close the comparing window as represented at 260, and the display screen would then be updated to delete the window as reflected in operation 264. However, even though closed, the database would remain and the user could later open the comparing window and have the previously-selected regions and associated tags re-displayed within the comparing window. Lastly, as reflect by operation 290, the comparison tool could also be closed (e.g., "DONE" at 294), once again removing the display but saving the database content so that upon re-invoking the tool at a later time the previously selected and tagged regions would be available.

Also contemplated is the possibility that the document itself could be edited either during or in between use of the comparison tool. In this case, it may be preferable to embed delimiters within the document to identify the selected regions and associated tags. And, such delimiters could include the information from the database, and in effect serve as the database itself; being stored in conjunction with or as part of the document. Text that has been added to the database (i.e., has been selected for comparison) should have visual markers within the original document to indicate that this text is being used by the comparison tool. If this text is subsequently deleted from or moved within the original document, the user would receive an "Are You Sure?" message, and have the choice to continue or cancel. If the user continues, in the case of deletion the text will be deleted from the original document and also from the comparison tool. In the case of moving, the database would be updated to indicate the new location of the selected text.

Figure 3:
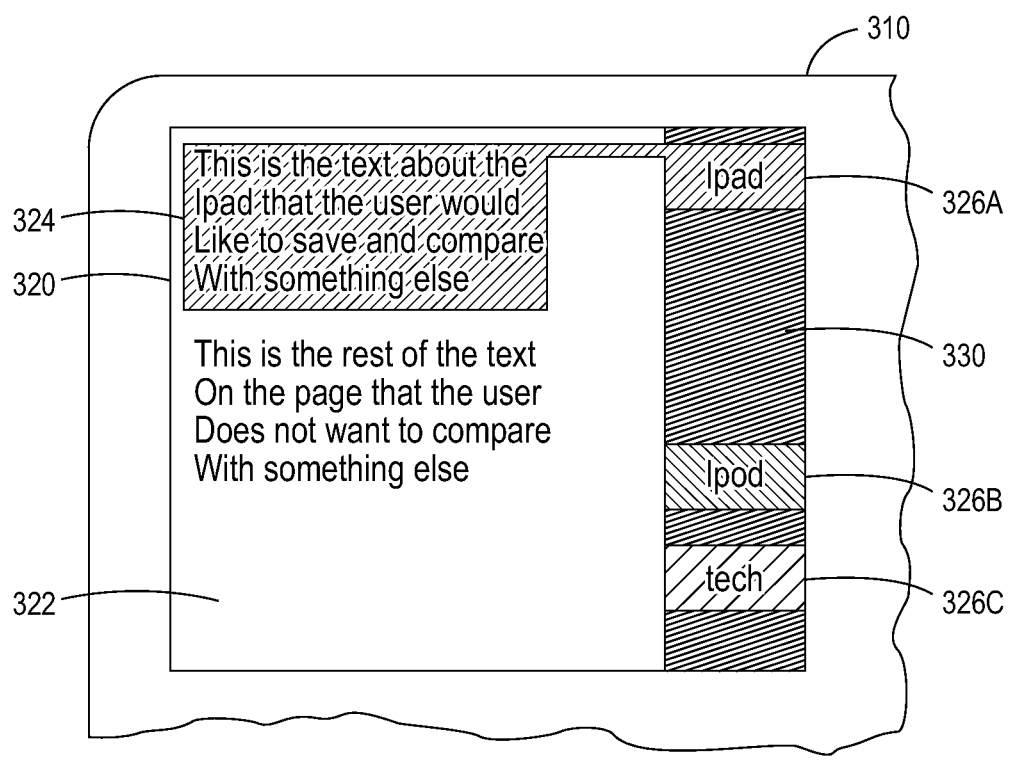
FIGS. 3-4 are exemplary illustrations of a comparison display window on a display of the system.
Figure 4:
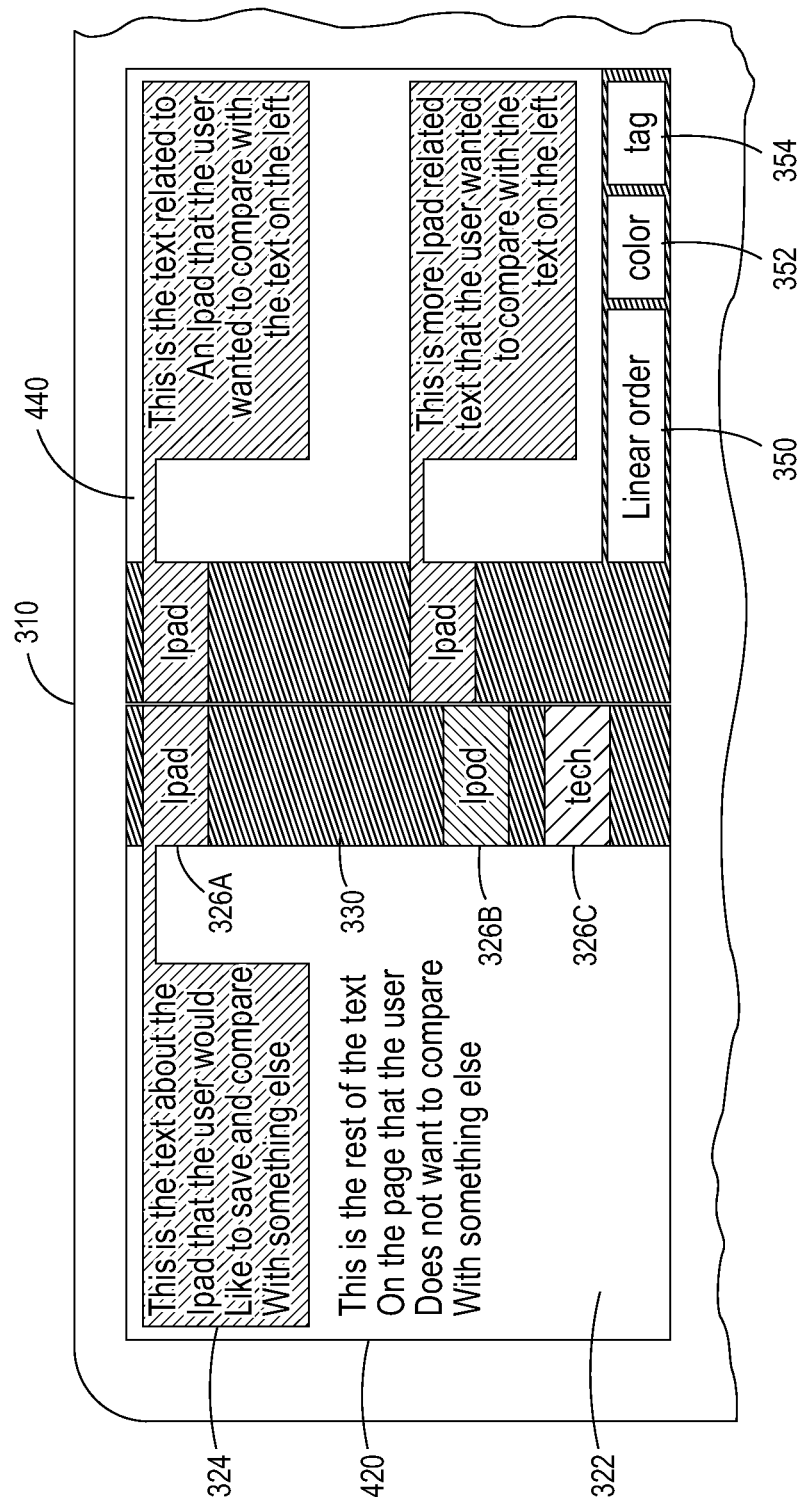

Having descried the general operations of the comparison tool as depicted in FIG. 2, reference is now made to FIGS. 2-4, in describing an exemplary user interface. For example, once a content region has been selected (e.g., indicated by highlight 224), operation 226 presents the user with a tag or marker prompt, such as a window with a text field in it, into which the user can type one or more identifiers (e.g., Ipad, ipod, tech), or the user can choose to tag the passage with a specific color or other visual marker. The tags 326A-C, once entered, will be associated with the selected region, and the database 50 would be updated by computing device 22 to include the tag name as well as the boundary of the selection for subsequent retrieval and display of the selection in relation to the tag. As indicated in the database example above, and in the illustrations of FIG. 3, users may label the tag or marker with a color and/or text string to remind them of the content that is selected on a page 322. And, as users select multiple areas of the document, more markers become available in the sidebar 330. Users can then select a marker 326A-C to navigate to the content attached to that marker, and can thereby compare content (region 324) by easily flipping between different markers within display window 320.

Selecting and tagging a region, along with a display such as depicted in FIG. 3 would provide a comparing window such as window 320 to be displayed on a display screen 310. It will be further appreciated that the magnification within the window 320 may be different than that depicted in the document being reviewed so as to permit a magnified view for the user, or to present a reduced-size view so that greater context can be considered. The size of the window 320, as well as the magnification, could also be automatically adjusted in a dynamic fashion in response to selecting a tag. Within window 320 the user may select content regions they would like to visually examine in parallel.

In FIG. 3, the user has selected the text region 324 at the top left of the screen. When the text is selected, a marker or tag 326 (e.g., green rectangle) is attached to the text region in the database, and in the display itself, and placed in the sidebar 330. The user has the option of adding a tag ("Ipad") to the marker and setting or changing its color. The other two markers (326B, 326C) labeled "ipod" and "tech" are marking text on a different page—either in the same document or in different documents. To see the text associated with those markers, the user would select the associated marker in the sidebar 330.

If a user(s) wants to examine or review selected regions of a document's content they can drag the marker(s) 326 into the comparing window 420 on display 310 to lay out the selections in their preferred order. Thus, users can control the arrangement of the selections in window 420 by dragging the markers along the side bar into the sequence they desire. In FIG. 4, window 420 includes a right-side region 440 that provides copies of the selections in the require order, and associated with the selection and tag in the left side of the window. They can also order content by clicking one of the buttons (350, 352, 354) in the bottom of region 440 that allow them to group the content in different ways. For example, after re-arranging content, users could click button 350 so that the program operates to re-order the content as it is ordered in the original document. Other buttons, such as button 352 and 354 could allow users to group content based on characteristics of the markers. For example, content attached to green markers could be grouped separately from content attached to red markers. Or, content labeled with a specific tag in the marker could be grouped together.

For example, in FIG. 4, a user has dragged two green markers tagged as "Ipad" into the comparing window. The user can rearrange the markers in that window by dragging the associated tags into the preferred order within the sidebar 330. The linear order button 350 at the bottom of the window allows the user to reorder the markers in linear order (the order in which the selected passages occurred in the original document). The color button 352 allows the user to group the markers by color, and the tag button 354 allows the user to group the markers by the tag that they are labeled with. Of course these are just examples of how information could be ordered within the document, and it will be further appreciated that there may be other ways that have not been specifically mentioned, including grouping by document source, etc.

Also recognized is that users could also choose a menu option that automatically places all content with pre-specified criteria into the comparison window. For example, the user could choose a menu option that automatically places all content with green and yellow tags into the comparison window. The menu could place the content in linear order by default, and the user could then reorder the content by dragging or clicking buttons like "color" (352) and "tag" (354), or other buttons that they could customize, to arrange the content based on marker characteristics.

As noted relative to FIG. 2, users can also delete markers from either sidebar at any time, both via a main reader/editor window or in the comparing window itself. Deleting can be done by any known means consistent with the operating system and/or editing software being used. For example, right-clicking on a marker and choosing "delete" or dragging to a trash icon (not shown). When a marker is deleted, the content in the original document remains, but the associated database information (record for that marker) is removed. In other words, only the marker associated with the content and the ability to pull the marker and selected region into the comparing window are taken away.

As previously suggested there are several fundamental differences between the disclosed comparing window and existing document editing and review tools. At one level, the functionality described might be considered similar to, or even incorporate, "bookmark" or "index" capability in, say, MS-Word. However, the envisioned capability is a hybrid between "human" and "machine" marking where all the tags or labels are defined by the human, although the uniqueness of the label is maintained by the machine, which augments the label. For example, the "ipad" label would be human-readable, but underlying would be a scheme of "ipad.01", "ipad.02", etc. automatically created by the machine. When a user compares "like" items, the computer platform running the comparing window tool actually makes the required collection and storage of distinct selections. Furthermore, the marking described here has a "context" or a "length" associated with it. It is not simply a pointer to a location, but is both pointer and content marker.

Also contemplated is that while a device is being used in a comparison mode, the region of the individual markers could be moved or expanded individually to see content around the initial selection-so the content stays in context of the rest of the content around the marked region. This means the region in the marker can be changed in comparison mode also. For example, the region could be expanded to include text above or below, to expand the boundaries all in a similar amount or factor outward, etc.

The disclosed embodiments are also distinct from a conventional "indexing" procedure in that the current embodiments permit a full inversion of the index, again enabled by a hybrid scheme maintaining uniqueness and being content-aware by adding range/length information to the label. In other words, the disclosed system and method provides an easier way to compare digital content by leveraging the affordances that paper provides (i.e., users can digitally clip passages from a document and place them side by side to visually examine them in parallel.) For example, selected passages may also be reordered by the user in an ad-hoc fashion, by simply dragging them into a different order. In this situation, the ordering does not have to be done in accordance with pre-specified rules.

Although described and illustrated relative to a single display, as noted previously relative to FIG. 1, there may be multiple channels or sources of documents to be compared using the disclosed system and method. Moreover, the current disclosure is intended to cover an extension of the tool such that the tool would allow a user to compare content across devices. For example, if the software were downloaded onto more than one device, the user could open a document on one device and enter compare mode. This mode allows the user to choose what to compare with the document that is currently open. When the user chooses a document to compare, that document could be automatically opened on another device that is within close proximity to the device that is already being used (or that the user identifies from a list of available devices or some other way of pairing the devices). Alternatively, the user can drag the document to be compared toward a second device, and it will automatically be shown in that device. Also contemplated is an application in which, in addition to opening another document for comparison on a different device, the user could alternatively open the comparison window on a different device so that a document is open on a first device but the comparison window is open on a second device. And, the user could drag a selected passage from the document on the first device toward the second device with the comparison window to add that passage to the window. As will be appreciated, such an embodiment would require a sharing of the document(s), and database entries associated therewith, amongst the devices being used.

It should be understood that various changes and modifications to the embodiments described herein will be apparent to those skilled in the art. Such changes and modifications can be made without departing from the spirit and scope of the present disclosure and without diminishing its intended advantages. It is therefore anticipated that all such changes and modifications be covered by the instant application.

What is claimed is:

1. A system to facilitate a user's visual comparison of digital document content, comprising:
    a device having a processor to execute programmatic instructions;
    a display screen for the display of at least a portion of the digital document content to the user, said display screen facilitating the user making a selection of multiple distinct regions of information with the digital document content displayed;
    a memory, operatively associated with the processor, for storing marker data relating to the user's selection of each of multiple distinct regions of information within the digital document content, each in association with a user-specified marker; and
    a dynamically updateable comparing window, displayed on said display screen, said comparing window depicting at least a plurality of the distinct regions, and for each of the plurality of distinct regions depicted in the display window the user-specified marker associated therewith, to facilitate side-by-side comparison of the regions and the associated marker data by the user;
    wherein in response to a user command, the markers and the distinct regions are rearranged in the comparing window and the relative display position of at least one document region is automatically changed in the comparing window.

2. The system according to claim 1, wherein the display further includes an interface selection to automatically re-order the markers and their associated selected regions in the order in which the selected document regions appear in the document content.

3. The system according to claim 2, wherein the document regions are identified from documents found across multiple devices.

4. The system according to claim 3, wherein the device displays a document to compare located on another device in proximity.

5. The system according to claim 3, wherein a comparison window is displayed located on another device in proximity.

6. A method to visually compare digital document content, comprising:
    displaying, on a display screen operating under the programmatic control of a processor, a user interface including a display window for:
        selecting a first region within a document for comparison, said first region being visually depicted as having been selected, and said system automatically assigning a first marker to the first region, and storing, in a database accessible to at least said processor, a first marker record including data for said first marker, each record in said database including a unique identifier for the associated marker, boundary data for the region selected, and at least one marker characteristic selected from the group consisting of marker location, marker color, marker tag and document source;
        selecting at least a second region for comparison, said second region being visually depicted as having been selected, and said system automatically assigning a second, unique marker to the second region and storing, in the database, a second marker record including data for said second marker;
        wherein at least the first and second regions are selected from the group consisting of a common document and different documents;
    presenting a comparing window on the display screen, said comparing window depicting the first region and at least the second region along with respective markers for each of the regions to facilitate comparison of the regions by a viewer, wherein at least the first region and the second region are retrieved from the digital document content and presented, in a side-by-side manner along with at least one marker characteristic, to facilitate comparison, and where the depictions of the first region and the second region are a function of the boundary data for each of said regions; and
    in response to a user command, at least the first or second region and a respective marker are rearranged in the comparing window.

7. A method to visually examine portions of digital document content, comprising:
    using a display screen, the display of which is under the programmatic control of a processor operatively associated therewith, a user selecting a plurality of document regions for comparison, said regions each being visually depicted as having been selected, and said system automatically assigning a unique marker to each selected region;
    in a database accessible to said processor, in response to each user selection of document regions for comparison, creating a record for each selected document region and in the record providing a user-specified tag to each selected region;
    presenting, to the user, a comparison window on a visual display, said comparison window depicting the content of at least two selected document regions therein, along with the associated markers retrieved from the database, to facilitate comparison of the regions by the user, wherein the regions presented for comparison are based, at least in part, on at least one common characteristic of the user-specified tag; and in response to a user command, rearranging the relative display position of at least one selected document region and its associated marker in the comparison window.

8. The method according to claim 7, wherein the markers are rearranged in the comparison window in response to a user dragging at least one marker into a position relative to another marker, and where in response to the user dragging one marker in relation to another marker the relative display positions of the selected document regions associated with each marker are also changed.

9. The method according to claim 8, wherein the user is also provided with an interface selection to automatically re-order the markers and associated selection document regions in accordance with the order in which the selected document regions appear in an original order in the digital document content.

10. The method according to claim 9, wherein the selected document regions may be identified from documents found across multiple devices, and where the database includes a network location that identifies one of the multiple devices on which the document resides.

11. The method according to claim 10, wherein the user, using a first computing device, chooses a document to compare from another device in proximity to the first device.

12. The method according to claim 10, wherein the user, using a first computing device, chooses to display the comparison window on a second device.

13. The method according to claim 10, wherein the user, using a first computing device drags the document to be compared toward a second device so as to cause the document to be compared to automatically be displayed via the second device.

14. The method according to claim 7, wherein at least one document region can be modified within the comparison window to display additional context about a selected region.

15. The system according to claim 1, where the marker data includes at least one marker characteristic selected from the group consisting of marker location, marker color, marker tag and document source, and wherein the display further includes an interface selection to automatically re-order the markers and their associated selected regions by at least one marker characteristic.

16. The method according to claim 7, wherein the at least one common characteristic of the user-specified tag is stored in the database for each selected document region and is selected from the group consisting of a marker location, a marker color, a marker tag and a document source.

* * * * *